Sept. 15, 1936.  W. D. STOVALL ET AL  2,054,565
PORK RIND BAIT AND METHOD OF PREPARING THE SAME
Filed Feb. 5, 1934

Patented Sept. 15, 1936

2,054,565

UNITED STATES PATENT OFFICE

2,054,565

PORK RIND BAIT AND METHOD OF PREPARING THE SAME

William D. Stovall and Joseph W. Gale, Madison, Wis., assignors, by direct and mesne assignments, of three-fifths to Robert Malcom, Chicago, Ill.

Application February 5, 1934, Serial No. 709,826

4 Claims. (Cl. 99—3)

It has heretofore been customary in the use of pork rind strips for bait to cut the same to the desired shape and pack them in a liquid brine solution to preserve them against decay and in a soft and pliable condition for use. This method of preparing and packing pork rind bait is objectionable, however, for the reason that it requires the use of somewhat bulky bottles or containers, and necessitates the exercise of care in the handling of the bottle to prevent spilling or loss of brine, and likewise prevents the individual strips being left in the open or packed individually in a bait box or tackle book, and in other ways renders the use of pork rind inconvenient under certain conditions.

The present invention is directed to a pork rind strip which is treated in such a way as to permit it to be preserved indefinitely in the dry condition, so that individual strips will always be ready for use and may be conveniently carried in the pocket or in a tackle book or box without danger of deterioration. Furthermore, the present method of packing is one which permits the strips to be quickly restored to a pliable condition when immersed in the water and to resume the natural white color, so that in use the strips will wave or flutter during casting and retrieving, and thereby add a lifelike appearance to the hook to which the bait is attached.

Further objects and details of the invention will appear from a description thereof in conjunction with the accompanying drawing, wherein,—

Figure 1 is a plan view of a plain strip embodying the features of the present invention; and Fig. 2 is a forked strip embodying the features of the present invention.

In preparing the pork rind for use, it is desirable first of all to subject it to a salt treatment so as to dry out the blood from the rind, and thereafter to scrub the rind thoroughly in order to remove all of the salt. With the rind properly prepared, it is then slit to the form of a thin strip or ribbon in order to secure the necessary lightness and pliability to afford the waving or fluttering movement desired in the use of pork rind baits. By cutting the strips thin, it is possible also to thoroughly cure them in the manner presently to be described.

After the strips are cut to the desired size and shape, they are then immersed in a chlorine water solution of strength running from one to ten percent, depending upon the condition of the rind, since some rinds tend to bleach or whiten more readily than others. The average length of time within which the strips should remain in the chlorine water solution is from twelve to eighteen hours, in order to bleach the strips to the desired degree of whiteness.

After the strips have been thoroughly bleached, they are placed in a glycerine solution of strength from fifteen to twenty-five percent, in which they remain until thoroughly cured, which ordinarily occupies from twenty-four to forty-eight hours, although the strips can remain in the glycerine solution for much longer periods without deterioration. It will be understood that the above procedure is by way of exemplification only, since variations in time and in the strength of the solutions can be made to suit requirements, without departing from the spirit of the invention.

After the pork rind strips have been thoroughly cured in the glycerine solution, they are dried and packed and are ready for use. It is desirable, although not essential, to pack the cured strips in oil-proof envelopes or similar containers, in order to prevent evaporation of the glycerine, particularly on a hot day, or when the strips are exposed to the sun.

In the cured and dried condition, the strips are practically free from odor and are semi-transparent or translucent and of a skin color, but upon immersion in the water, the strips regain their white condition and become more flexible or pliable, so that almost immediately after a strip is fastened onto a hook and immersed in the water, it is in condition for use and may thereafter be used repeatedly in casting, since it is tough and flexible and not easily disengaged from the hook.

In use, either form of strip may be employed, but under varying conditions which indicate the use of live frogs for bait, the forked strip is particularly effective, since in form it resembles the trailing legs of a frog.

The bait of the present invention is not only odorless but clean and easy to handle, since an envelope containing a number of the baits may readily be carried in the pocket and used under conditions which would render the use of the ordinary brine packed pork strips inconvenient or objectionable.

We claim:

1. The method of preparing pork rind strips which consists in cutting the strips in the form of a thin ribbon to afford lightness and pliability and in thereafter curing the strips by immersion in glycerine for a sufficient period of time to secure a sufficient impregnation of glycerine to permit the strips to be preserved in a dry condition and to acquire the flexibility and pliability necessary to simulate the motions of a live bait when immersed in water.

2. The method of preparing pork rind strips which consists in cutting the strips in the form of a thin ribbon to afford lightness and pliability, subjecting the strips to a bleaching operation and in thereafter curing the strips by immersion in glycerine for a sufficient period of time to secure a sufficient impregnation of glycerine to permit the strips to be preserved in a dry condition and to acquire the flexibility and pliability necessary to simulate the motions of a live bait when immersed in water.

3. The method of preparing bait strips that consists of removing salt from pork rind, cutting the rind into strips, bleaching the strips, subjecting the strips to the action of glycerine until they are impregnated throughout with glycerine in preservative quantity, and thereafter drying the strips.

4. A substantially dry thin pork-rind bait-strip impregnated throughout with glycerine in preservative quantity, said strip being capable of turning white and of becoming pliable and flexible and of simulating live bait when immersed in water, and having the property of resuming substantially its initial condition and of retaining its keeping qualities on drying after removal from water.

WILLIAM D. STOVALL.
JOSEPH W. GALE.